United States Patent
Baur et al.

(10) Patent No.: US 6,312,013 B1
(45) Date of Patent: Nov. 6, 2001

(54) METHOD OF UPDATING THE TRIGGER THRESHOLD OF A PASSIVE SAFETY SYSTEM

(75) Inventors: Richard Baur, Pfaffenhofen; Guenter Fendt, Schrobenhausen; Helmut Steurer, Junkenhofen, all of (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/448,714

(22) Filed: Nov. 24, 1999

(30) Foreign Application Priority Data

Nov. 25, 1998 (DE) .............................................. 198 54 366

(51) Int. Cl.$^7$ ................................................. B60R 21/32
(52) U.S. Cl. ............................................. 280/735; 701/45
(58) Field of Search ................................ 280/735; 701/45

(56) References Cited

U.S. PATENT DOCUMENTS

| | | | |
|---|---|---|---|
| 3,964,016 | * 6/1976 | Yamada et al. | 340/52 H |
| 4,836,024 | 6/1989 | Woehrl et al. | 73/514 |
| 5,173,614 | 12/1992 | Woehrl et al. | 307/10.1 |
| 5,446,661 | * 8/1995 | Gioutsos et al. | 364/424.05 |
| 5,490,069 | * 2/1996 | Gioutsos et al. | 364/424.05 |
| 5,540,461 | * 7/1996 | Nitschke et al. | 280/735 |
| 5,580,084 | 12/1996 | Gioutsos | 280/735 |
| 5,609,358 | * 3/1997 | Iyoda et al. | 280/735 |
| 5,712,784 | * 1/1998 | Fendt et al. | 364/424.055 |
| 5,748,477 | * 5/1998 | Katoh | 364/461 |
| 5,809,439 | * 9/1998 | Damisch | 701/45 |
| 5,868,423 | * 2/1999 | Takimoto et al. | 280/735 |
| 5,871,232 | * 2/1999 | White | 280/735 |
| 6,003,808 | * 12/1999 | Nguyen et al. | 244/1 R |
| 6,020,812 | * 2/2000 | Thompson et al. | 340/438 |
| 6,031,484 | * 2/2000 | Bullinger et al. | 342/72 |
| 6,043,736 | * 3/2000 | Sawahata et al. | 340/438 |
| 6,125,313 | * 9/2000 | Watanabe et al. | 701/45 |

FOREIGN PATENT DOCUMENTS

| | | |
|---|---|---|
| 3816591 | 11/1989 | (DE) . |
| 4305172 | 8/1994 | (DE) . |
| 4412105 | 12/1995 | (DE) . |
| 0612643 | 8/1994 | (EP) . |

* cited by examiner

*Primary Examiner*—Eric Culbreth
*Assistant Examiner*—L. Lum

(57) ABSTRACT

In a method of operating a passive safety system, such as an airbag supplemental restraint system in a motor vehicle, the trigger threshold value for triggering the deployment of the airbag or the like is updated or changed over time as the vehicle deteriorates with age or operation. As a result of material fatigue, rust and the like, the vehicle chassis becomes less stiff with increased age and/or increased operation. Consequently, the crash behavior of a deteriorated vehicle differs from that of a new vehicle of the same type. Namely, the deceleration during a crash will be less abrupt. To achieve reliable, consistent and timely triggering of the airbag regardless of advancing deterioration of the vehicle, the trigger threshold value is reduced by pre-determined correction values responsive to an increase of one or more degradation-related parameters, such as the age of the vehicle as indicated by a clock, the cumulative operating time of the vehicle as indicated by an operating hour meter, and/or the cumulative distance traveled by the vehicle as indicated by an odometer.

17 Claims, 2 Drawing Sheets

METHOD OF UPDATING THE TRIGGER THRESHOLD OF A PASSIVE SAFETY SYSTEM

PRIORITY CLAIM

This application is based on and claims the priority under 35 U.S.C. §119 of German Patent Application 198 54 366.2, filed on Nov. 25, 1998, the entire disclosure of which is incorporated herein by reference.

FIELD OF THE INVENTION

The invention relates to a method of updating a trigger threshold of a passive safety system including a passive safety device, such as an air bag or a seat belt tensioner, which is especially for use in a motor vehicle.

BACKGROUND INFORMATION

Devices and methods are known in the art for measuring acceleration-dependent signals that are relevant to the safety of passengers in a vehicle involved in a crash or other sudden impact. Such acceleration-dependent signals, for example, relate to the present instantaneous acceleration of the vehicle, an acceleration integral and/or the change in velocity. Throughout the present specification, the term "acceleration" is understood to refer to or include negative acceleration or deceleration, as is experienced by a vehicle in a crash.

Trigger devices are also known that can trigger safety devices such as airbags and seat belt tensioners in response to and dependent on those acceleration-dependent signals. To determine whether a safety device should be triggered, the value of the particular incoming acceleration-dependent signal is compared to a so-called trigger threshold, that is the threshold value for triggering the device. For example, an acceleration sensor provided in a vehicle outputs a signal that is indicative of the instantaneous acceleration (or deceleration) of the vehicle. If this acceleration signal exceeds the threshold value, then the trigger circuit will activate a triggering device to deploy the respective associated safety device. various types and arrangements of triggering devices and comparator circuits are known in the art, and the details thereof are not pertinent and are not limiting as to the present invention.

It is also known that a trigger device can have an adaptable or adjustable trigger threshold value, as can be seen in the German Patent DE 38 16 591. Therein, the trigger threshold value is adapted to certain sudden crash-like situations, dependent on various determined operating parameters of the vehicle, in order to increase the trigger sensitivity of the restraining means. Particularly, the above mentioned German Patent discloses using the change in velocity as the correction value for changing the trigger threshold value. An optimal adaptation, however, can only be achieved for new motor vehicles, because the above mentioned operating parameters have now been found to vary over time as a vehicle ages.

Throughout this specification, the terms "age", "aging" and the like are not limited to chronological age, but rather refer to any factor that degrades or deteriorates a motor vehicle, and particularly the chassis or frame of the motor vehicle, from its new condition. Such factors include, without limitation, the chronological age of the vehicle, the total cumulative miles traveled by the vehicle, the total cumulative operating hours of the vehicle, the degree of vibration to which the vehicle has been subjected while operating (e.g. due to traveling on bumpy roads), the degree of rusting of the vehicle frame or body, etc. For example, a vehicle that has been driven a great total cumulative distance under severe conditions (e.g. bumpy unpaved roads, or a number of small accidents or impacts) may be substantially "aged" and deteriorated from its new condition, regardless of its chronological age. Long term tests have shown that, as a vehicle degrades or deteriorates, i.e. "ages" regardless of the cause, the stiffness of the vehicle frame changes significantly as a result of material fatigue, joint fatigue, rust degradation, and the like, especially for some types of vehicles. It has also been shown by tests or investigations, that the existing safety devices such as airbags were not triggered in some cases of frontal impact accidents involving older vehicles, due to the above mentioned aging or degrading influences.

OBJECTS OF THE INVENTION

In view of the above it is an object of the invention to provide a method of operating a passive safety system in a vehicle, so as to enable reliable and consistent triggering of the safety device(s) of the safety system regardless of the vehicle age, i.e. in older or deteriorated vehicles as well as in new vehicles. Particularly, the inventive method aims to take into account one or more degradation-related parameters relating to the degree of degradation or deterioration of the vehicle. It is also an object of the invention to provide a circuit arrangement for carrying out such a method. The invention further aims to avoid or overcome the disadvantages of the prior art, and to achieve additional advantages, as apparent from the present specification.

SUMMARY OF THE INVENTION

The above objects have been achieved in a method and in a circuit arrangement according to the invention, wherein the trigger threshold is automatically updated as a function of at least one degradation-related parameter of the vehicle. The trigger threshold is updated or changed over time, dependent on this degradation-related parameter, preferably so that the responsiveness of the safety system is not affected by the aging (i.e. degradation) of the vehicle, or at least so that the influence of the aging of the vehicle on the responsiveness of the safety system is partially compensated.

This degradation-related parameter according to the invention may be the chronological age of the vehicle, the cumulative operating time of the vehicle, the total traveled distance of the vehicle, the determined degree of rusting of the vehicle frame or body, the cumulative or integrated vibrations to which the vehicle has been subjected during its operation, the cumulative or integrated acceleration variations that the vehicle has undergone during its operation, the cumulative or integrated engine speed (rpm) of the vehicle's engine during operation, the number of small shocks or impacts suffered by the vehicle (e.g. below a threshold for triggering the safety devices but above a threshold at which degradation of the vehicle structure results), the measured stiffness of the vehicle chassis or frame, or any other factor that is indicative of the actual existing strength and/or stiffness characteristic of the vehicle chassis or frame.

Tests have shown that the characteristic curve of the deceleration as a function of time, of an older vehicle undergoing a collision or other crash impact is significantly different from the corresponding characteristic deceleration curve of a new vehicle undergoing the same crash impact (even if the old and new vehicles are of the same type, class or manufacturer model). Throughout this specification, the term "crash impact" refers to a sudden deceleration of a vehicle, which exceeds a deceleration level that is considered safe or acceptable for passengers of the vehicle. Also, the term "vehicle class" refers to a group of vehicles that share similar characteristics and particularly the same characteristic deceleration curve in a crash test when compared to other vehicles of the same class and the same vehicle age. For example, all cars of a particular manufacturer's model will be within the same class.

The different deceleration curves exhibited by vehicles of the same class but of different ages (i.e. degrees of degradation) result because the stiffness or rigidity of the frame of a vehicle relaxes as the vehicle "ages" as a result of various factors as mentioned above. This is due to degradation of the vehicle frame caused by fatigue and rust, among other things. As a result of this reduced stiffness or rigidity, the rate of decrease in velocity, i.e. the deceleration, of an older vehicle involved in a frontal crash for example, is less pronounced than that of a new vehicle. In other words, the older vehicle is "softer" and "eases into" the crash, in comparison to the newer vehicle which is "stiffer" and therefore decelerates more abruptly in a crash. While the total change in velocity is the same for both vehicles, the newer car decelerates e.g. from 80 km/h to 0 km/h in a shorter time interval than the older car.

Consequently, the signal generated by the impact sensor in the older car might never exceed the trigger threshold that was established for the car when it was new, or the signal might exceed the trigger threshold but only at a later time than optimal. Thus, the safety devices will not be deployed or will be deployed too late for ensuring optimal safety for the passengers of the vehicle. Throughout this specification, the term "passengers" encompasses all occupants of a vehicle. By taking into account the change in crash behavior of an older vehicle, the reliability of safety systems in motor vehicles that are operated for a number of years or a great distance or under harsh conditions is improved. On the basis of crash testing, it is possible to determine a characteristic aging influence on the deceleration or change in velocity of a vehicle in a crash situation. Once this aging characteristic is determined, the age (or a degradation-related parameter) of a vehicle can be used according to the invention to adapt or compensate the operation of trigger devices for passive safety systems.

There are a number of ways in which the age of a vehicle can be taken into account according to the invention. For example, the chronological age of a vehicle can easily be calculated as the difference between a stored manufacture date and the actual or present determined time. Alternatively, or as a supplemental value, the operating hours of a vehicle can be used as the variable parameter, as can the number of miles or kilometers indicated by the vehicle odometer. Furthermore, these variables can be used alone or in any combination. In a preferred embodiment, as the vehicle age (or deterioration condition) exceeds specified age steps or thresholds, the trigger threshold is accordingly reduced stepwise as the age or extent of degradation of the vehicle increases. In another preferred embodiment, the present method is used in parallel with any other method for adapting or adjusting the trigger threshold values of trigger devices of passive safety systems in vehicles.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF PREFERRED EXAMPLE EMBODIMENTS AND OF THE BEST MODE OF THE INVENTION

Figure 1:
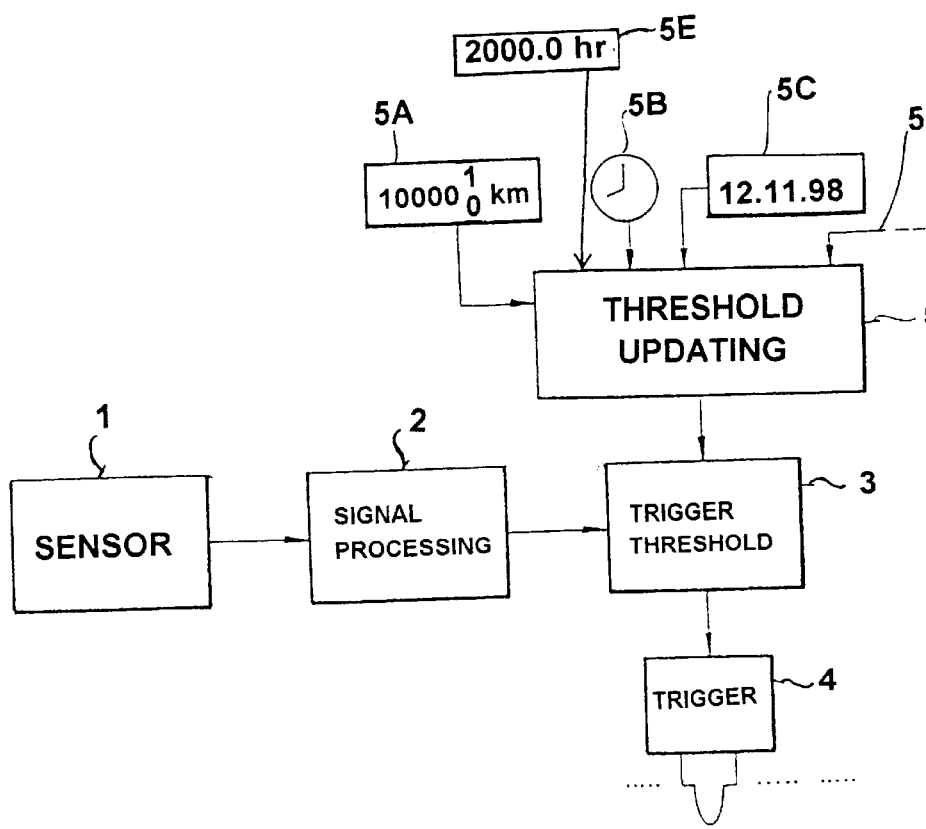
FIG. 1 is a schematic block diagram of a passenger safety system of a vehicle, in which the triggering arrangement has an updatable trigger threshold according to the present invention.

FIG. 1 is a block diagram of an arrangement for controlling the triggering of passive safety devices, comprising a sensor unit 1, a unit for signal processing 2, an updatable trigger threshold unit 3, a trigger unit 4, as well as a trigger threshold update unit 5. The update unit 5 determines the degradation-related condition of the vehicle as will be discussed in detail below. The sensor unit 1 continuously measures one or more acceleration-dependent parameters that are relevant to safety, for example by means of signals generated by one or more respective acceleration sensors. The signal processing unit 2 processes the signals from the sensor unit 1 and feeds the processed signals to the trigger threshold unit 3. Trigger threshold unit 3 comprises a comparator circuit that compares the one or more incoming acceleration-dependent signals to one or more respective trigger threshold values that are stored in or externally provided to the trigger threshold unit 3. If an acceleration-dependent signal exceeds its respective trigger threshold value, the trigger threshold unit 3 sends an impulse to the trigger unit 4, which in turn activates one or more safety devices (not shown).

The sensor unit 1, the signal processing unit 2, and the trigger unit 4 may have any known construction, arrangement and operation. The trigger threshold unit 3 may also be generally conventional in construction and operation. The special features of the invention involve the threshold update unit 5, and its effect of updating or changing the value of the trigger threshold or thresholds of the trigger threshold unit 3 over time.

In a preferred embodiment, the update unit 5 automatically updates the trigger threshold signal value or values as a function of the deterioration or degradation of the vehicle as indicated by the age and/or operating time. Alternatively, or additionally, other degradation-related parameters may further be taken into account by the update unit 5, as will be discussed below. This update unit 5 generates a correction value that automatically updates the trigger threshold value or values according to an update rule executed by the update unit 5.

Figure 2:
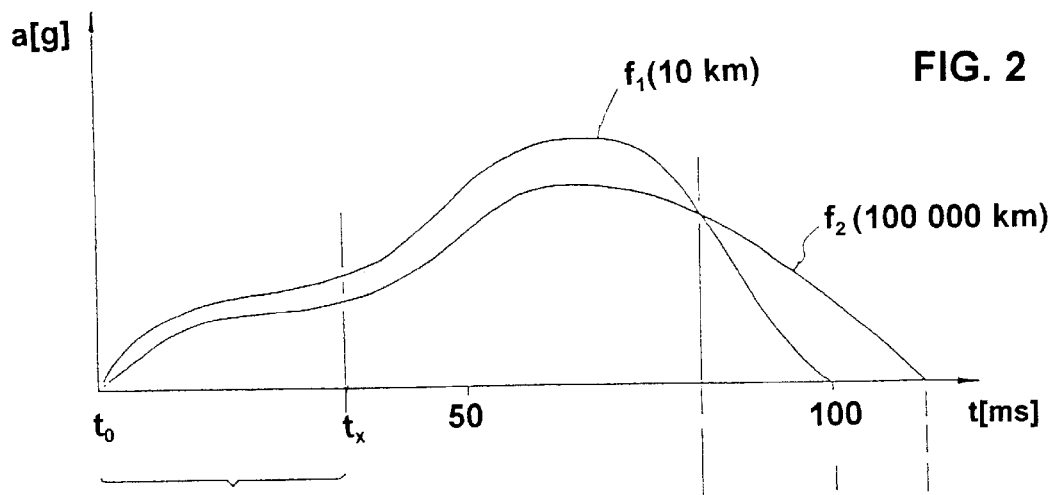
FIG. 2 is a graph of acceleration (deceleration) over time in a new vehicle and in an older vehicle respectively undergoing a crash impact.
Figure 3:
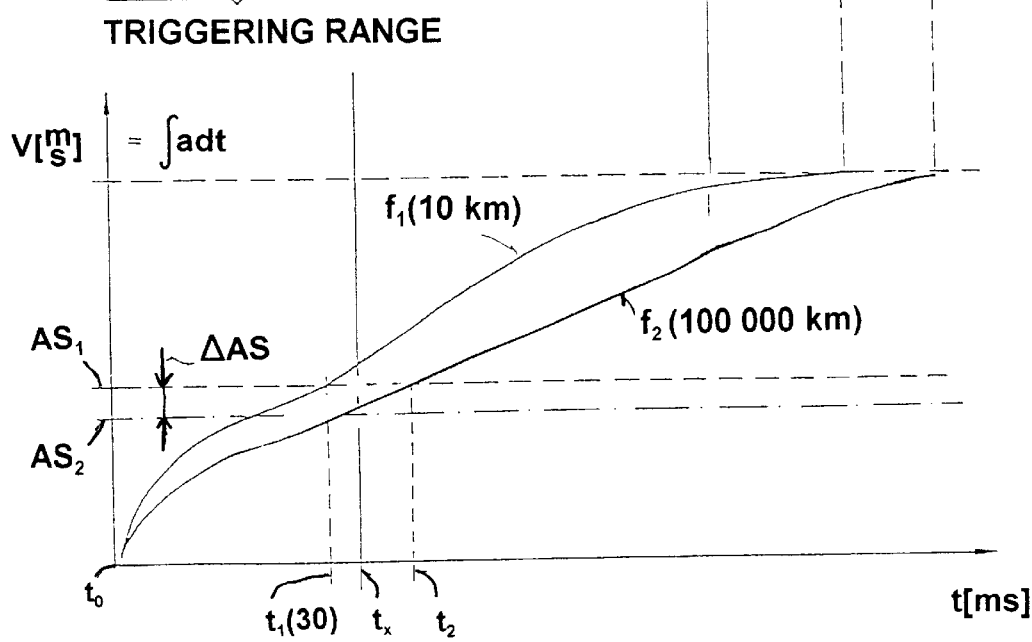
FIG. 3 is a graph of velocity as an integral of the acceleration over time in a new vehicle and in an older vehicle.

FIGS. 2 and 3 illustrate the updating of the trigger threshold value so as to enable reliable and consistent age-independent triggering of a passive safety device in an older (or deteriorated) vehicle, which has been subject to degradation resulting from age and/or operating time of the vehicle, for example. In the method of the present invention, one or more sensors may send respective acceleration-dependent signals through the signal processing unit 2 to the trigger threshold unit 3, for respective independent comparison to separate trigger thresholds. For example, separate sensors, signals and thresholds may be associated with the triggering of front airbags, rear airbags, side airbags, airbag curtains, rollover bars, seatbelt tensioners, etc. Due to the different crash behaviors of a vehicle respectively in relation to these distinct protective devices, the inventive method may be carried out differently (e.g. with different updating rules) for different ones of the thresholds, or only for some of the thresholds and not for others, etc. For the sake of simplicity, the following description of the method will be based on the example of a single signal being processed.

FIG. 2 shows the time progression of a processed acceleration signal. A new-vehicle curve $f_1$ illustrates the acceleration characteristic of a new vehicle (driven approximately 10 km, for example), subjected to a frontal impact at high speed (approximately 80 km/h). An older-vehicle curve $f_2$ illustrates the acceleration characteristic of an older vehicle (driven 100,000 km, for example), subjected to the same 80 km/h frontal impact. FIG. 3 shows the corresponding velocity curves or signals v that are typically determined in the signal processing unit 2 as an integral of the corresponding acceleration. It can be assumed that the two vehicles involved in this example are substantially identical, except for the different degrees of deterioration resulting from or associated with the respective different age or cumulative distance traveled.

If the rigidity or stiffness of the frame of the older vehicle has changed as a consequence of the age and/or distance driven, for example as a result of fatigue of bearing parts or weld joints, or from rust, then the crash deceleration characteristic and thus also the velocity characteristic are different for this old vehicle in comparison to those of the new vehicle. Even though the two vehicles ultimately undergo the same total change in velocity, i.e. from 80 km/h to 0 km/h, the acceleration and velocity characteristics of the two vehicles differ especially in the most critical time interval immediately following an impact. This difference affects how quickly the triggering arrangement can react to a crash impact.

FIG. 3 shows the latest possible triggering time point $t_x$ at which the safety device must be triggered in order to be safe and effective for the vehicle passengers. The new-vehicle curve $f_1$ in FIG. 3 has reached the trigger threshold value AS1 at time $t_1$ and thus caused deployment of an airbag or the like before the latest acceptable time point $t_x$. On the other hand, the older-vehicle curve $f_2$ shows that the change of velocity is more gradual for the older vehicle, especially in the time period immediately following the impact. Thus, at time $t_x$, the older-vehicle curve $f_2$ has not yet reached the trigger threshold value AS1 that had been properly established for a new vehicle. Instead, the curve $f_2$ will only reach the threshold AS1 at the later time $t_2$. As a result, the airbag will not have been deployed by the latest acceptable point of time $t_x$, and will instead be deployed too late to be effective, or other circuits of the safety system may completely block such a too-late triggering of the airbag which could otherwise cause injuries to the passengers.

It is thus a definite safety advantage to lower the trigger threshold by an amount AAS to a corrected trigger threshold AS2 for the older vehicle, as shown in FIG. 3. The correction amount AAS or the new trigger threshold value AS2 must be selected so as to enable timely triggering of the safety devices in high speed or dangerous crash impacts and yet avoid triggering in non-dangerous low speed accidents. In FIG. 3, the lower threshold AS2 is selected so that the older vehicle will trigger the airbag at time $t_1$ (e.g. 30 msec), namely the same time at which the airbag would be triggered in the new vehicle for a crash of the same severity (80 km/h). The change in the trigger threshold value, shown in FIG. 3 schematically as a single-step reduction, can of course be implemented in multiple steps, whereby each step corresponds to a particular step or time span of aging of the vehicle.

A multiplicity of variables resulting from the construction of the vehicle effect the deterioration-dependent changes in the crash behavior of a vehicle. The size and stiffness of the vehicle are particularly important factors influencing the crash behavior of a vehicle. Through a series of crash tests with a series of test vehicles of a particular type, class, manufacturer's model or the like, but of different ages (i.e. degrees of deterioration), it is possible to determine for a vehicle of this type or class, characteristic curves or functions of the change in crash behavior relative to a selected degradation-related parameter such as the chronological age or the like. This is shown, for example, in FIGS. 2 and 3 for only two sample vehicles of two different ages. As has been described above, such degradation-dependent functional variations are then used to determine correction values or rules for automatically updating or adapting a trigger threshold for standard production vehicles of the corresponding type or class. It is preferable to determine a multi-step reduction in the trigger threshold values for each type or class of vehicle, corresponding to the degradation condition of the vehicle in corresponding age steps or age groups, and to store the stepped correction values in the update unit 5.

An engineer in this field will have numerous possibilities for automatically determining, indicating or estimating the degree of deterioration or degradation of a vehicle due to "aging", even for existing mass-produced vehicles. For example, the method of the present invention can make use of the pre-existing technical accessories of the vehicle, such as an electronic clock counting from the manufacturing date (5B and 5C in FIG. 1), an operating hour meter (5E) e.g. a so-called Hobbs meter that is coupled to the ignition and counts the active operating hours of the vehicle, or an electronic odometer (5A). The outputs of these devices are fed into the threshold updating unit 5, to estimate the degradation-related condition of the vehicle and automatically derive the corresponding correction value for the trigger threshold value. For example, such correction values can be determined is from values stored in a table, or from threshold comparisons, or from characteristic curve functions.

Additionally, or alternatively, various other parameters can be taken into consideration by the updating unit 5. In this context, the results of periodically required vehicle safety inspections or tests can be used to affect the correction value. For example, a visual judgment of the rust condition of the vehicle, or a test result of the stiffness of the vehicle chassis or frame can be input automatically or manually (see 5D in FIG. 1) into the threshold updating unit 5 for selecting or contributing to the selection of the correction value for the triggering threshold. Any of the other parameters mentioned above herein, such as the cumulative or integrated vibrations to which the vehicle has been subjected during its operation, the cumulative or integrated acceleration variations that the vehicle has undergone during its operation, the cumulative or integrated engine speed (rpm) of the vehicle's engine during operation, the number of small shocks or impacts suffered by the vehicle (e.g. below a threshold for triggering the safety devices but above a threshold at which degradation of the vehicle structure results), or the like may be provided by appropriate sensors and circuits into the threshold updating unit 5 to be taken into account for selecting the threshold correction value.

It is also possible to manually directly select the appropriate threshold correction value in view of the results of vehicle safety inspections and tests, by inputting a selection signal via the input 5D in FIG. 1. Moreover, the trigger threshold value may be manually reset, e.g. increased back to its "new-vehicle" value, if a vehicle has undergone an overhaul or repair to return its chassis strength or stiffness to a like-new or nearly-new condition, or if testing of the vehicle chassis condition determines that the vehicle is actually not as deteriorated as was indicated by the parameter (e.g. chronological age) being used in the particular threshold updating technique.

In a further preferred embodiment, the present method for the deterioration-dependent updating of the trigger threshold value can be used in parallel with other methods for adapting the trigger threshold value in trigger devices for passive safety systems. For example, the present method can be used in parallel with a method that reduces the trigger threshold value through early recognition of an accident or crash impact by means of a pre-crash or pre-impact sensor, for example an infrared or radar sensor system. In this embodiment, all trigger threshold values of the system are also corrected as a function of the age of the vehicle. Some threshold values may be left un-updated, if the crash behavior does not warrant updating these particular values.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of operating a passenger safety system including a triggerable safety device in a vehicle, said method comprising the following steps:
   a) setting a trigger threshold value;
   b) providing a first signal that is dependent on an acceleration of said vehicle;
   c) comparing said first signal to said trigger threshold value;
   d) providing a second signal that is dependent on a degradation-related parameter which is taken to be indicative of a degradation condition of said vehicle; and
   e) changing said trigger threshold value over time, dependent on and responsive to said second signal.

2. The method according to claim 1, further comprising an additional step that comprises triggering said safety device if said comparing in said step c) determines that said first signal exceeds said trigger threshold value.

3. The method according to claim 1, wherein said steps b) and c) are carried out continuously during operation of said vehicle.

4. The method according to claim 1, wherein said steps d) and e) are carried out continuously during operation of said vehicle.

5. The method according to claim 1, wherein said step e) is carried out intermittently and repetitively during operation of said vehicle so as to change said trigger threshold value in successive steps.

6. The method according to claim 1, wherein said safety system includes a plurality of said triggerable safety devices, said step a) comprises respectively setting a plurality of distinct ones of said trigger threshold values, said step b) comprises respectively providing a plurality of said first signals that are respectively dependent on acceleration of said vehicle, said step c) comprises respectively comparing said first signals to said trigger threshold values, and said step e) comprises changing one of said trigger threshold values without changing another of said trigger threshold values.

7. The method according to claim 1, wherein said degradation-related parameter is a chronological age of said vehicle, and said step d) comprises generating said second signal as a difference between a stored time of manufacturing said vehicle and a current actual clock time.

8. The method according to claim 1, wherein said degradation-related parameter is a chronological age of said vehicle, and said step d) comprises generating said second signal as an output signal of a clock circuit that begins counting time at time zero upon the manufacturing of said vehicle.

9. The method according to claim 1, wherein said degradation-related parameter is a cumulative operating time of said vehicle, and said step d) comprises generating said second signal as an output of an operating time clock that advances whenever an engine of said vehicle is operating.

10. The method according to claim 1, wherein said degradation-related parameter is a cumulative distance traveled by said vehicle, and said step d) comprises generating said second signal as an output of an odometer that advances as said vehicle travels and in accordance with the distance traveled by said vehicle.

11. The method according to claim 1,
   further comprising an additional step of providing a plurality of age threshold values respectively corresponding to successive steps of increasing degradation of said degradation condition, and comparing said second signal to said age threshold values, and
   wherein said step e) comprises reducing said trigger threshold value in a stepwise manner responsive to a determination in said additional step that said second signal has exceeded a respective one of said age threshold values.

12. The method according to claim 1, wherein said step e) comprises reducing said trigger threshold value to a lower value dependent on and responsively to a change of said second signal corresponding to an increase of said degradation-related parameter of said vehicle.

13. The method according to claim 1, further comprising a step of changing said trigger threshold value over time, dependent on and responsive to another parameter that is not related to said degradation condition of said vehicle, in addition and parallel to said changing of said trigger threshold value in said step e).

14. The method according to claim 13, wherein said step a) comprises respectively setting a plurality of distinct ones of said trigger threshold values, and wherein said step e) comprises respectively changing all of said trigger threshold values.

15. The method according to claim 1, further comprising specifying a threshold value update rule, and wherein said changing of said trigger threshold value in said step e) is carried out in accordance with said threshold value update rule.

16. The method according to claim 15, wherein said specifying of said threshold value update rule comprises crash testing a plurality of test vehicles that all belong to a single vehicle class and that each respectively have different ones of said degradation conditions, measuring a respective time progression of an acceleration-dependent signal of each respective one of said test vehicles during said crash testing to respectively provide a plurality of testing signal curves, determining from said testing signal curves how said time progressions of said acceleration-dependent signals of said test vehicles vary depending on said degradation conditions of said test vehicles respectively, and then specifying said threshold value update rule for said vehicle so that said first signal will exceed said trigger threshold value at a specified time interval after a crash impact of said vehicle regardless of the value of said degradation-related parameter of said vehicle.

17. A circuit arrangement of a passenger safety system of a vehicle, comprising:

an impact sensor;

a trigger threshold;

a comparator having a first comparator input connected to an output of said sensor and a second comparator input connected to an output of said trigger threshold;

a safety device trigger connected to an output of said comparator;

a trigger threshold update circuit having an output connected to an input of said trigger threshold; and at least one vehicle degradation-related signal generating device selected from the group consisting of a chronological time clock, an engine operation timer, and a travel distance odometer, having an output connected to an input of said trigger threshold update circuit.

* * * * *